US008715448B2

(12) United States Patent  (10) Patent No.: US 8,715,448 B2
Niimi et al.  (45) Date of Patent: May 6, 2014

(54) METHOD FOR PRODUCING LAMINATE FOR CONFIGURING IMAGE DISPLAY DEVICE, AND IMAGE DISPLAY DEVICE USING THE SAME

(75) Inventors: Kahoru Niimi, Shiga (JP); Makoto Inenaga, Shiga (JP); Takahisa Uchida, Shiga (JP)

(73) Assignee: Mitsubishi Plastics, Inc., Tokyo (JP)

( * ) Notice: Subject to any disclaimer, the term of this patent is extended or adjusted under 35 U.S.C. 154(b) by 0 days.

(21) Appl. No.: 13/521,868

(22) PCT Filed: Sep. 1, 2011

(86) PCT No.: PCT/JP2011/069880
§ 371 (c)(1),
(2), (4) Date: Aug. 22, 2012

(87) PCT Pub. No.: WO2012/032995
PCT Pub. Date: Mar. 15, 2012

(65) Prior Publication Data
US 2012/0328890 A1   Dec. 27, 2012

(30) Foreign Application Priority Data

Sep. 6, 2010 (JP) ................................. 2010-198942
Sep. 6, 2010 (JP) ................................. 2010-198943

(51) Int. Cl.
*B32B 37/12* (2006.01)
(52) U.S. Cl.
USPC ..................................................... 156/273.5
(58) Field of Classification Search
USPC ............. 156/242, 272.2, 273.3, 273.5, 275.5, 156/275.7; 428/522
See application file for complete search history.

(56) References Cited

U.S. PATENT DOCUMENTS

| 4,717,605 | A  | * | 1/1988  | Urban et al. ................. | 428/1.53 |
| 2002/0025441 | A1 | * | 2/2002  | Hieda et al. .................. | 428/440 |
| 2003/0194526 | A1 | * | 10/2003 | Vesley et al. ................ | 428/64.1 |
| 2007/0077372 | A1 | * | 4/2007  | Chung ........................... | 428/1.5 |
| 2008/0230177 | A1 |   | 9/2008  | Crouser et al. |  |
| 2009/0104448 | A1 | * | 4/2009  | Thompson et al. ........... | 428/413 |

FOREIGN PATENT DOCUMENTS

| JP | 11 181361 | 7/1999 |
| JP | 2000 336331 | 12/2000 |
| JP | 2004 77887 | 3/2004 |
| JP | 2004 210866 | 7/2004 |
| JP | 2009 109532 | 5/2009 |
| JP | 2009 109533 | 5/2009 |
| JP | 2009 230039 | 10/2009 |
| JP | 2010 522354 | 7/2010 |
| JP | 2010 186068 | 8/2010 |
| WO | 2010 044229 | 4/2010 |

OTHER PUBLICATIONS

International Search Report Issued Oct. 18, 2011 in PCT/JP11/069880 Filed Sep. 1, 2011.

* cited by examiner

*Primary Examiner* — Daniel McNally
(74) *Attorney, Agent, or Firm* — Oblon, Spivak, McClelland, Maier & Neustadt, L.L.P.

(57) ABSTRACT

A method for producing a laminate for configuring an image display device is provided, capable of realizing simultaneously unevenness followability and anti-bubble reliability. A method for producing a laminate for configuring an image display device is proposed, comprising the following steps (1) and (2):

(1) The step of forming an adhesive composition into the form of a monolayer or a multilayer sheet, and by UV-crosslinking, primary-curing this thereby forming a pre-secondary curing transparent double-sided adhesive sheet.

(2) The step of layering two image display device-constituting members via the pre-secondary curing transparent double-sided adhesive sheet and then irradiating ultraviolet light from at least a first image display device-constituting member side, UV-crosslinking through this member and secondary-curing the pre-secondary curing transparent double-sided adhesive sheet.

13 Claims, No Drawings

METHOD FOR PRODUCING LAMINATE FOR CONFIGURING IMAGE DISPLAY DEVICE, AND IMAGE DISPLAY DEVICE USING THE SAME

TECHNICAL FIELD

The present invention relates to a method for producing a laminate for configuring an image display device, which can be used as a constituting member of an image display device such as a personal computer, a mobile terminal (PDA), a gaming machine, a television (TV), a car navigation, a touch panel or a pen tablet.

TECHNICAL BACKGROUND

In recent years, in order to improve the visibility of image display devices, filling of the gap between an image display panel such as LCD, PDP or EL and a protective panel or a touch panel member disposed on the front side (viewing side) thereof has been carried out with a pressure-sensitive adhesive sheet, adhesive or the like, thereby suppressing the diffused reflections that occur when there is no filling, i.e., the diffused reflections at the air/layer interface, of an incoming beam or an outgoing light from the displayed image.

For instance, a display device is described in Patent Reference 1, in which the gap between the LCD (liquid crystal panel display) and a touch panel is filled with a transparent resin (adhesive), allowing the reflection of light to be reduced between the touch panel and the liquid crystal display panel.

A problem has been pointed out, that when the gap between an image display panel and a protective panel or a touch panel member is filled with a transparent resin (adhesive) in this way, if a defect or the like exists at the interface between the image display panel and the transparent resin (adhesive) or at the interface between the protective panel or the like and the transparent resin (adhesive), a gas build-up occurs with this defect as the origin, by exposure under a high temperature and high humidity environment or by exposure to a sudden change in temperature, provoking bubbling or peeling.

Consequently, a variety of studies have been carried out in order to solve such problems.

For instance, production methods for display devices with an optical function member built-in are proposed in Patent References 2 and 3, which involves photo-curing (or heat-curing) an adhesive composition beforehand and producing an adhesive composition that is in a partially crosslinked state, then followed by bonding together an optical function member and a display portion via this adhesive composition, and thereafter heat-curing (or photo-curing) the adhesive composition by heat treatment (or light irradiation).

A method described in Patent Reference 4 involves including a high molecular weight acrylic polymer within a pressure-sensitive adhesive composition thereby increasing cohesive strength, imparting resistance to bubbling, and suppressing peeling.

In addition, the present applicants have proposed in Patent Reference 5 or the like, a novel transparent adhesive sheet that can be adhered without generating residual air bubbles, even if there were an unevenness of on the order of 5 μm to 20 μm on the adhered surface, and furthermore can be adhered without bubbling under a high temperature environment of, for instance, on the order of 80° C. even if the adherend were a material that generates outgas such as plastic.

PRIOR ART REFERENCES

Patent References

[Patent Reference 1] Japanese Patent Application Laid-open No. 2004-077887
[Patent Reference 2] Japanese Patent Application Laid-open No. 2009-109532
[Patent Reference 3] Japanese Patent Application Laid-open No. 2009-109533
[Patent Reference 4] Japanese Patent Application Laid-open No. 2004-210866
[Patent Reference 5] International Publication No. 2010/044229

SUMMARY OF THE INVENTION

Problems to be Solved by the Invention

With the methods described in Patent References 2 and 3 mentioned above, a material that possesses both photo-curability and heat-curability is used, and since there is the risk that the organic peroxide that will be added not only will cause gelation of the composition at processing but also provoke such problems as bubbling or oxidation corrosion of the adherend due to reaction decomposition products of the organic peroxide, giving photo-curability and heat-curability to an adhesive sheet used in such type of applications should be avoided.

In addition, although anti-bubble reliability becomes sufficient if adhesive strength and cohesive strength are provided to an extent that can counter the gas pressure of an outgas generated from a protective panel or the like as described above, since this means the adhesive sheet is stiff by as much, if there were unevenness on the surface of the adherend or if a foreign substance or the like is present at the bonding interface, such unevenness cannot be followed sufficiently.

Thus, an object of the present invention is to provide a method for producing a laminate for configuring an image display device capable of simultaneously realizing unevenness followability and anti-bubble reliability.

Means to Solve the Problems

The present invention proposes a method for producing a laminate for configuring an image display device having a constitution in which image display device-constituting members are layered via a transparent double-sided adhesive sheet, and the method for producing a laminate for configuring an image display device comprises at least the following steps in (1) and (2):

(1) the step of forming an adhesive composition into the form of a monolayer or a multilayer sheet, and primary-curing this to form a pre-secondary curing transparent double-sided adhesive sheet by UV-crosslinking; and (2) the step of layering two image display device-constituting members via the pre-secondary curing transparent double-sided adhesive sheet and then irradiating ultraviolet light from at least one side of image display device-constituting member side, UV-crosslinking through this member to secondary-cure the pre-secondary curing transparent double-sided adhesive sheet.

Since the pre-secondary curing transparent double-sided adhesive sheet obtained in the step (1) still has room for being cured further, in other words, still has room for being UV-crosslinked further and is flexible as much, even if there were unevenness on the surface of an adherend or if a foreign substance or the like were present at the bonding interface, it can follow these unevennesses sufficiently to adapt. Thus, in the step (2), if two image display device-constituting members are layered via such a pre-secondary curing transparent double-sided adhesive sheet, each image display device-constituting member can be brought into tight contact adequately.

Then, in the step (2), by irradiating UV light from at least one side of image display device-constituting member side, UV-crosslinking through this member and secondary-curing, the pre-secondary curing transparent double-sided adhesive sheet can be crosslinked firmly, allowing for the provision of adhesive strength and cohesive strength to an extent that can counter, for instance, the gas pressure of an outgas generated from a protective panel or the like.

In this way, method for producing a laminate for configuring an image display device of the present invention can realize simultaneously unevenness followability and anti-bubble reliability, which are in general in a trade-off relationship.

Modes for Carrying Out the Invention

Hereafter, an example of embodiment of the present invention will be described; however, the present invention is not limited to the embodiment described below.

<Method for Producing a Laminate for Configuring an Image Display Device>

The method for producing a laminate for configuring an image display device according to the present embodiment (hereafter abbreviated as "the present production method") is a method for producing a laminate for configuring an image display device provided with a constitution in which image display device-constituting members are layered via a transparent double-sided adhesive sheet (hereafter abbreviated as "the present adhesive sheet"), the method for producing a laminate for configuring an image display device (hereafter abbreviated as "the present laminate") comprising at least the following steps in (1) and (2):

(1) the step of forming an adhesive composition into the form of a monolayer or a multilayer sheet, and by UV-crosslinking, primary-curing this thereby forming a pre-secondary curing transparent double-sided adhesive sheet; and (2) the step of layering two image display device-constituting members via the pre-secondary curing transparent double-sided adhesive sheet and then irradiating UV light from at least a first image display device-constituting member side, UV-crosslinking through this member and secondary-curing the pre-secondary curing transparent double-sided adhesive sheet.

With the methods described in prior art, an adhesive material that possesses both photo-curability and heat-curability is used to carry out primary curing and secondary curing, which have different crosslinking means; however, there is the risk that a heat-curing agent added for heat-curing purposes such as an organic peroxide, an isocyanate compound, an epoxide compound or an amine compound not only will cause gelation of the composition at processing but also provoke such problems as bubbling or oxidation corrosion of the adherend due to reaction decomposition products. In contrast, with the present production method, since primary curing and secondary curing are both carried out by UV-crosslinking, such matters of concern pertaining to heat-curing process can be eliminated.

Since the pre-secondary curing transparent double-sided adhesive sheet obtained in the step (1) still has room for being UV-crosslinked further and is flexible as much, even if there were unevenness on the surface of an adherend or if a foreign substance or the like were present at the bonding interface, it can sufficiently follow, adapt to, wet and adequately be brought into tight contact with, these unevennesses. Then, in the step (2), by being secondary-cured, it can be crosslinked firmly, allowing for the provision of adhesive strength and cohesive strength to an extent that can counter for instance the gas pressure of an outgas generated from a protective panel or the like.

<Adhesive Composition>

First, in the present production method, an example of adhesive composition that can be used suitably for forming a monolayered transparent double-sided adhesive sheet (hereafter abbreviated as "the present adhesive composition") will be described. However, this is merely an example and the present production method is not limited thereto.

With the present production method, it is important that, during the first ultraviolet irradiation, the adhesive composition is UV-crosslinked so as to have potential UV-reactivity, in other words, so as to leave UV-reactivity.

In addition, adhesive composition is a solvent-free system that does not contain a solvent, and forming an adhesive composition into a film by hot-melting are desirable.

As a mean that is for UV-crosslinking the adhesive composition so as to being hot-melt forming capable and to leave UV-reactivity in this way, for instance, means in which a base polymer having a predetermined range of molecular weight is used, and, an intermolecular hydrogen-abstracting photo-polymerization initiator is used as a crosslinking initiator, and, the amount of crosslinking agent is reduced, can be cited. However, there is no limitation to such means.

(Base Polymer)

From such points of view as adhesiveness, transparency and resistance to climate, the present adhesive composition preferably uses a (meth)acrylic acid ester series polymer (hereafter abbreviated as "acrylic acid ester series (co-)polymer" with the meaning of including copolymers) as the base resin.

The acrylic acid ester series (co-)polymer serving as the base resin can be prepared by suitably selecting the types and the composition ratios of the acrylic monomer or the methacrylic monomer, and further, the polymerization conditions, which are used for polymerizing this, thereby suitably adjusting physical characteristics such as the glass transition temperature (Tg) and molecular weight.

As acrylic monomers or methacrylic monomers that are used for polymerizing an acrylic acid ester (co-)polymer, for instance, 2-ethylhexyl acrylate, n-octyl acrylate, isooctyl acrylate, n-butyl acrylate, ethyl acrylate, methyl methacrylate, methyl acrylate, and the like, can be cited. These that possess a hydrophilic group, an organic functional group or the like, including vinyl acetate, hydroxyethyl acrylate, acrylic acid, glycidyl acrylate, acrylamide, acrylonitrile, methacrylonitrile, fluorine acrylate, silicon acrylate and the like, can also be used.

As polymerization treatments that use these monomers, well-known polymerization methods such as solution polymerization, emulsion polymerization, block polymerization and suspension polymerization can be adopted, in which case, an acrylic acid ester copolymer can be obtained by using a polymerization initiator such as a heat-polymerization initiator or a photo-polymerization initiator according to the polymerization method.

Preferably, the present adhesive composition is a solvent-free system, that is to say, does not contain a solvent, is hot-melt formable, and at the primary cured stage, has adequate adhesive strength and has flexibility that enables following the unevenness or a foreign substance on an adherend surface. Film production by hot-melting is not possible whether the molecular weight of the base polymer is too large or too small. In addition, if the molecular weight of the base polymer is too small, there is the possibility that even if primary cured, no adhesive strength is exerted, or, being too soft, handleability is poor; conversely, if the molecular weight is too large, being hard at the primary cured stage, there is the possibility of not being able to follow the unevenness or a foreign substance on an adherend surface.

Thus, from such point of view, it is desirable to use an acrylic acid ester series (co-)polymer in which the mass average molecular weight of the base polymer is 100,000 to 700,000, in particular 200,000 or greater, or 600,000 or lower, and above all, in particular 250,000 or greater or 500,000 or lower.

Among these, using an acrylic acid ester series (co-)polymer which mass average molecular weight (MW)/number average molecular weight (MN) is 5 to 10, of which 6 or greater or 9 or less, is more desirable. A large mass average molecular weight/number average molecular weight means that the molecular weight distribution is broad, and if this value is as large as on the order of 5 to 10, since the low molecular weight components and the high molecular weight components respectively contribute to capabilities on par with their molecular weights, such as fluidity, wettability and cohesive strength, there is a tendency for processability and adhesive capability to be better than those with narrow (homogeneous) molecular weight distributions.

In addition, among the acrylic acid ester series (co-)polymers, it is desirable to use acrylic acid ester random copolymers, and among these, acrylic acid ester random copolymers containing two species of monomer with large differences between the glass transition temperature (Tg) of each of the monomer component constituting the random copolymer, that is to say, for each monomer component constituting the acrylic ester random copolymer, the glass transition temperature (Tg) of the polymer polymerized with only a single monomer each.

In so doing, the difference in glass transition temperature (Tg) between the two species of monomer component is preferably 25 to 300° C., in particular 40° C. or higher or 200° C. or lower, of which in particular 60° C. or higher or 180° C. or lower, and further, all the more preferably 100° C. or higher or 180° C. or lower.

Concretely, it is desirable that the glass transition temperature (Tg) of the first monomer component is −100 to 0° C., in particular −80 to −20° C., and the glass transition temperature (Tg) of the second monomer component is 0 to 250° C., in particular 20 to 180° C.

As the monomer component with the lower glass transition temperature (Tg), for instance, a monomer component with a Tg of −100 to 0° C., it is desirable to use an acrylic acid ester in which the number of carbons of the side chain is 2 or greater, and in particular 4 or greater.

Meanwhile, as the monomer component with high glass transition temperature (Tg), for instance, a monomer component with a Tg of 0 to 250° C., it is desirable to use a vinyl monomer or a (meth)acrylic monomer, or the like, having the side chain of a hydrocarbon in which the number of carbons is 2 or lower, in addition a cyclic structure such as an alicyclic structure, a heterocycle or an aromatic, or a functional group such as a carboxyl group, a hydroxyl group, an amino group, an amide group, a glycidyl group, an acetyl group or an isocyanate group.

The indentation hardness of the transparent double-sided adhesive sheet can be adjusted by adjusting the proportions of the monomer component with high Tg (i.e., the monomer for which the glass transition temperature when the monomer has been polymerized alone is high) and the monomer component with low Tg (i.e., the monomer for which the glass transition temperature when the monomer has been polymerized alone is low) in the acrylic acid ester series copolymer serving as the base polymer. For instance, in order to raise the indentation hardness, it suffices to increase the contents in the monomer component with high Tg. Conversely, when rendering the sheet flexible, it suffices to increase the contents in the monomer component with low Tg.

In addition, it is possible to lower the hardness by softening with a plasticizer, or adjust the hardness suitably with additives such as oligomers.

(Crosslinking Agent)

As crosslinking monomers (crosslinking agents) used when crosslinking an acrylic acid ester series (co-)polymer, for instance, multi-functional (meth)acrylates having two or more (meth)acryloyl groups are desirable.

Regarding the amount of crosslinking agent, since, if the amount of crosslinking agent is large, the reaction proceeds rapidly and regulation of the reaction is difficult, it is desirable to adjust the amount of crosslinking agent so as to be able to stop crosslinking even in mid-course.

From such point of view, the amount of crosslinking agent, with respect to 100 parts by mass of base polymer, is preferably 0 to 30 parts by mass, in particular 20 parts by mass or less, of which 10 parts by mass or less, and among these in particular 5 parts by mass or less.

A reason for being able to reduce the amount of crosslinking agent in this way is also that an intermolecular hydrogen-abstracting photo-polymerizing initiator is used as crosslinking initiator.

(Crosslinking Initiator)

It is important to adopt an intermolecular hydrogen-abstracting photo-polymerizing initiator (also referred to as "hydrogen-abstracting photo-initiator") as the crosslinking initiator used in the present adhesive composition.

A photo-polymerization initiator generates a radical by light irradiation and becomes the starting point of the polymerization reaction in the system, with the generation mechanisms for (meth)acryloyl group and vinyl group reactive radicals being divided broadly into two classes: the intramolecular cleavage type, in which radicals are generated by cleavage and decomposition of an initiator's own single bond, and the hydrogen-abstraction type, in which radicals are generated by exciting a hydrogen from a hydroxyl group, or the like, in the system.

Those of the intramolecular cleavage type decompose and become different compounds when generating radicals by light irradiation, such that once reacted, they no longer have functions as reaction initiators, while those of the hydrogen-abstraction type revert to the original compounds even after inactivation and can be used repeatedly as reaction initiators by light irradiation. Consequently, in order to confer potential photo-curability, it is important to use a photo-polymerization initiator of the hydrogen-abstraction type.

As hydrogen-abstracting photo-initiators, for instance, any among benzophenone, Michler ketone, dibenzosuberone, 2-ethyl anthraquinone, thioxanthone, benzyl and the like, or derivatives thereof, or mixed components from the combination of two or more species thereof can be used. However, there is no limitation to the substances given above as photo-initiators of the hydrogen-abstraction type. In addition, photo-polymerization initiators of the intramolecular cleavage type may be used in combination in a variety of proportions if those of the hydrogen-abstraction type are contained in the adhesive sheet.

The amount of photo-polymerization initiator added is not limited in particular, and in general is adjusted preferably in a proportion of 0.1 to 10 parts by mass, in particular 0.2 parts by mass or more or 5 parts by mass or less, and among these, 0.5 parts by mass or more or 3 parts by mass or less, with respect to 100 parts by mass of base resin. However, this range may be exceeded in balancing with other elements.

(Other)

When crosslinking an acrylic acid ester series (co-)polymer, as necessary a reaction catalyst (tertiary amine series compound, quaternary ammonium series compound, tin laurate compound, and the like) may be added suitably.

(Multilayer Constitution)

When the present adhesive sheet is to be made into a multilayered transparent double-sided adhesive sheet, that is to say, when forming a transparent double-sided adhesive sheet with a layered constitution provided with an intermediate layer and outermost layers, it suffices to form the outermost layers thereof from the present adhesive composition described above.

When a layered constitution comprising an intermediate layer and outermost layers is to be given, the present adhesive sheet is preferably formed using the present adhesive composition described above, since it is desirable that the outermost layer is provided with unevenness followability and anti-bubble reliability as in the case of the monolayer described above. Meanwhile, it is desirable that the intermediate layer has light permeability to an extent that does not inhibit secondary curing reaction of outermost layers and has properties that elevate cuttability and handleability without loosing transparency, since it does not contribute to the bonding of image display device-constituting members.

While there is no particular limitation if the species of the base polymer forming the intermediate layer is a transparent resin, using a similar acrylic acid ester series (co-)polymer as described above is desirable. In so doing, from such points of view as securing transparency and ease of production, using an identical resin to the base polymer of the outermost layer is desirable.

The intermediate layer may be formed so as to be cured by UV-crosslinking, or may be formed so as to be cured by heat. In addition, it may be formed so as not to be post-cured in particular. However, when tightness of contact with the outermost layers or the like is considered, forming so that it post-cures is desirable, and in particular, forming so that it UV-crosslinks is desirable.

In so doing, since light transmittance drops if the content in crosslinking initiator becomes large, it is desirable that the UV-crosslinking agent is contained at a lower content percentage than the content percentage in the outer layer of the crosslinking initiator in the intermediate layer.

(Thickness)

From the points of view of unevenness followability and thinning sought in the application members, the thickness of the present adhesive sheet is preferably 50 μm to 1 mm, and in particular 100 μm or greater or 500 μm or less is desirable.

In addition, when the sheet is to have a multilayer constitution, the ratio between the thickness of each of the outermost layers and the thickness of the intermediate layer is preferably 1:1 to 1:20, of which 1:2 to 1:10 is further desirable.

If the thickness of the intermediate layer is in the range described above, it is desirable, as the contribution of the thickness of the adhesive layer in the laminate does not become excessively large, and workability pertaining to cutting and handling does not degrade due to being excessively soft.

In addition, if the outermost layer is in the range described above, it is desirable, as followability of unevenness and curved surface does not degrade, and adherent strength and wettability towards the adherend can be maintained.

<Step (1)>

In Step (1), primary curing by UV-crosslinking is important so that the transparent double-sided adhesive sheet has potential UV-reactivity, in other words, so as to leave UV-reactivity.

In Step (1), it suffices to obtain a pre-secondary curing transparent double-sided adhesive sheet, for instance, by heat-melting (hot-melting) the present adhesive composition, coating this over a transparent release resin sheet to form a sheet of single layer or multiple layers, then, irradiating UV light through the transparent release resin sheet to UV-crosslink the present adhesive composition.

In so doing, while it is possible to adjust the extent of UV-crosslinking by controlling the amount of UV light irradiated, it is also possible to irradiate UV light through the transparent release sheet as described above thereby partially blocking the UV light so as to adjust the extent of UV-crosslinking.

Here, as examples of transparent release sheet, for instance, those comprising a cast film or a stretched film of the polyester series, the polypropylene series or the polyethylene series, release-treated by being coated with a silicon resin, release papers or the like, can be suitably selected and used, and in particular, release films with different peel strengths and release films with different thicknesses can be used.

The indentation hardness (C2 Asker hardness) (a) of the pre-secondary curing transparent double-sided adhesive sheet obtained in Step (1) is preferably in the range of $10 \leq (a) < 50$.

This C2 Asker hardness (a) is a value that may be measured with an Asker durometer (Asker C2L) by sequentially layering transparent double-sided adhesive sheets so that the total thickness is within the range of 5 mm to 7 mm.

The transparent double-sided adhesive sheet prior to adhesion to members requires a suitable degree of resilience to be rolled-up into rolls or cut, and also requires adhesive strength and wettability for bonding with members. Therefore, if the C2 Asker hardness (a) is 10 or greater, there is no risk that the sheet is too soft and lacks workability pertaining to rolling, and if the C2 Asker hardness (a) is less than 50, even if there were unevenness on the surface of an adherend or if a foreign substance or the like were present at the bonding interface, the sheet can sufficiently follow, adapt to, wet and adequately be brought into tight contact with, these unevennesses. Thus, having the C2 Asker hardness (a) in the range described above allows workability and adhesive physical properties to be compatible, and in addition, allows followability of steps due to printed portions or the like to be secured.

From such points, a C2 Asker hardness (a) of 15 or greater or 45 or less is all the more desirable, of which 20 or greater or less than 33 is further desirable.

The thickness of the transparent double-sided adhesive sheet, the amount of UV light irradiated, the radiation wavelength, the radiation apparatus, and the like, can be suitably adjusted.

<Step (2)>

In Step (2), layering two image display device-constituting members via the pre-secondary curing transparent double-sided adhesive sheet obtained in Step (1) and then irradiating UV light from at least the first image display device-constituting member side, UV-crosslinking through this member and secondary-curing the pre-secondary curing transparent double-sided adhesive sheet, is important Here, for instance touch panels, image display panels, surface protection panels, polarization films, and the like, can be cited as the image display device-constituting members described above, which may be any among these or laminates comprising combinations of two or more species.

Since a sufficient amount of light at a wavelength that is effective for exciting a photo-initiator within the transparent double-sided adhesive sheet causing it to generate a radical needs to arrive in order to provoke UV-crosslinking reaction in the transparent double-sided adhesive sheet via an image display device-constituting member, it is desirable that the UV transmittance of one of the image display device-constituting members is at a given level or higher.

In particular, for instance, when a glass plate is to be layered on the side of the pre-secondary curing transparent double-sided adhesive sheet where UV light is to be irradiated, the UV transmittance of the glass plate is preferably at a given level or higher, and, for instance, when a glass plate, an adhesive and a protection sheet are to be layered, the UV transmittance of the laminate of the glass plate, adhesive and protection sheet is preferably at a given level or higher.

Thus, the UV transmittance, that is to say, the light transmittance in the 315 nm to 400 nm wavelength range of UV-A waves, of the image display device-constituting member layered on the ultraviolet irradiation side of the pre-secondary curing transparent double-sided adhesive sheet is preferably 20% or greater, and in particular 30% or greater, of which in particular 40% or greater, is all the more desirable.

As members that may have such a light transmittance, those constituted from, for instance, a polycarbonate resin, an acrylic resin, a polyvinyl chloride resin, a polyester resin, a cellulose resin such as triacetyl cellulose or diacetyl cellulose, a styrene resin, and the like, can be cited. Among these, polycarbonate resins, acrylic resin, triacetyl cellulose resins and the like, have high hygroscopicity, and have the property that the moisture absorbed by the resin during storage is prone to being released as outgas from the resin when used under high temperature. According to the method for producing a laminate for configuring an image display device of the present invention, since bubbling caused by such outgas releases can be suppressed, resin members constituted from the polycarbonate resin, acrylic resin and triacetyl cellulose resin and the like, can be used as resin members constituting the laminate.

The indentation hardness (C2 Asker hardness) (b) of the post-secondary curing transparent double-sided adhesive sheet obtained in Step (2) is preferably in the range of $33 \leq (b) \leq 80$.

This C2 Asker hardness (b) is a value that may be measured with an Asker durometer (Asker C2L) by sequentially layering transparent double-sided adhesive sheets so that the total thickness is within the range of 5 mm to 7 mm.

By setting the C2 Asker hardness (b) of the post-secondary curing transparent double-sided adhesive sheet to 33 or greater, the sheet has sufficient adhesive strength and cohesive strength, and can counter for instance the gas pressure of an outgas generated from a protective panel or the like. Meanwhile, by setting the C2 Asker hardness (b) to 80 or lower, it is possible to eliminate such concerns as, the sheet being too stiff, the function as pressure-sensitive adherent is lost with an inferior tight contact strength, causing peeling and lifting to occur.

By adjusting the C2 Asker hardness (b) of the post-secondary curing transparent double-sided adhesive sheet to the range described above in this way, allows the provision of a cohesive strength that can resist the gas pressure that gradually aggregates after bonding at the bonding interface during long-term storage or under high temperature and high humidity environment, and a tight contact strength of suitable degree to an extent that the sheet does not peel.

From such point of view, it is further desirable that the C2 Asker hardness (b) of the post-secondary curing transparent double-sided adhesive sheet is 35 or greater or 60 or lower, of which 38 or greater or 50 or lower is all the more desirable.

In terms of the relationship between the C2 Asker hardness (a) of the pre-secondary curing transparent double-sided adhesive sheet and the C2 Asker hardness (b) of the transparent double-sided adhesive sheet after secondary curing, it is desirable to control the hardnesses so as to have a difference of two points or greater, that is to say, to be related by $(b)-(a) \geq 2$, of which $(b)-(a) \geq 3$ and among which $(b)-(a) \geq 4$ are all the more desirable.

<Laminate Used in Constituting an Image Display Device>

As laminates used in constituting an image display device that may be produced by the present production method, constitutive members of image display devices such as LCDs, PDPs or ELs such as for, for instance, personal computers, mobile terminals (PDAs), gaming machines, televisions (TVs), car navigations, touch panels, pen tablets, and the like, can be cited.

To cite one concrete example, in the image display device of a cellular phone, sometimes a polarization film, or the like, is layered over a liquid crystal panel display (LCD), and above this, a plastic protective panel is layered via an adhesive or a sheet. In so doing, a PVA (polyvinyl alcohol) or triacetyl cellulose resin is sometimes used as the constitutive material of the polarization film, which have been determined to be prone to release outgas.

Thus, if the present laminate is used as a laminate comprising the constitution of protective panel/adhesive sheet/polarization film, when used under high temperature, bubbling due to outgas released from the protective panel or the polarization film can be suppressed effectively.

Elsewhere, constitutions such as, for instance, liquid crystal panel/adhesive sheet/touch panel, liquid crystal panel/adhesive sheet/protective panel, liquid crystal panel/adhesive sheet/touch panel/adhesive sheet/protective panel, polarization film/adhesive sheet/touch panel and polarization film/adhesive sheet/touch panel/adhesive sheet/protective panel can be cited as constitution examples of the present laminate.

(Explanation of the Expressions and the Like)

In general, "sheet", by definition under JIS, refers to a product that is thin and flat, of which the thickness is small compared to the length and width; and in general, "film" refers to a thin and flat product, of which the thickness is extremely small compared to the length and width, maximum thickness is arbitrarily limited, and provided in general in the form of a roll (Japanese Industrial Standard JIS K6900). However, the boundary between a sheet and a film is not certain, and since there is no need in the present invention to discriminate the two in wording, in the present invention, "sheet" is deemed included even when referring to "film", and "film" is deemed included even when referring to "sheet".

In addition, when the expression "panel" is used, such as in image display panel and protective panel, this includes plate, sheet and film.

In the present Specification, when the statement "X to Y" (X and Y are any numbers) is made, unless expressly stated otherwise, along with the meaning of "X or greater but Y or less", the meaning of "preferably larger than X" or "preferably smaller than Y" are also included.

In addition, when the statement "X or greater" (X is any number) is made, unless expressly stated otherwise, the meaning of "preferably larger than X" is also included, and when the statement "Y or less" (Y is any number) is made, unless expressly stated otherwise, the meaning of "preferably smaller than Y" is also included.

EXAMPLES

Hereafter, the present invention will be explained in further detail by way of examples and Comparative Examples. However the present invention is not limited to these.

(Intermediate Resin Layer-Forming Layered Sheet 1)

An acrylic acid ester copolymer A (Mw=440,000; Mn=62,000; Mw/Mn=8; theoretical Tg: −50° C.) was prepared, comprising 75 parts by mass of 2-ethylhexyl acrylate (homopolymer Tg: −70° C.), 20 parts by mass of vinyl acetate (homopolymer Tg: +32° C.) and 5 parts by mass of acrylic acid (homopolymer Tg: +106° C.), which were random-copolymerized.

100 g of the UV-curing resin propoxylated pentaerythritol triacrylate (manufactured by Shin-Nakamura Chemical Co., Ltd., "ATM-4PL") as a crosslinking agent and 15 g of 4-methyl benzophenone as a photo-polymerization initiator were mixed to 1 kg of this acrylic acid ester copolymer A to prepare an intermediate resin layer composition (A-1).

The intermediate resin layer composition (A-1) was heat-melted and coated with an applicator so as to become 110 µm in thickness onto a release-treated polyethylene terephthalate film (manufactured by Panac Corporation, "NP75Z01"; thickness: 75 µm) serving as a coating substrate and then covered with a release-treated polyethylene terephthalate film (manufactured by Toyobo Co., Ltd., "E7006"; thickness: 38 µm) to produce an intermediate resin layer-forming layered sheet 1 comprising PET film/UV-crosslinkable intermediate resin layer (A-1; thickness: 110 µm)/PET film.

(Intermediate Resin Layer-Forming Layered Sheet 2)

An intermediate resin layer composition (A-2) was prepared in a similar manner to the intermediate resin layer-forming layered sheet 1 described above except that 200 g of trimethylolpropane triacrylate was mixed as the crosslinking agent and 50 g of 1-hydroxy-cyclohexylphenyl ketone was mixed as the photo-polymerization initiator.

The intermediate resin layer composition (A-2) was heat-melted and coated with an applicator so as to become 130 µm in thickness onto a release-treated polyethylene terephthalate film (manufactured by Panac Corporation, "NP75Z01"; thickness: 75 µm) serving as a coating substrate and then covered with a release-treated polyethylene terephthalate film (manufactured by Toyobo Co., Ltd., E7006; thickness: 38 µm) to produce an intermediate resin layer-forming layered sheet 2 comprising PET film/UV-crosslinkable intermediate resin layer (A-2; thickness: 130 µm)/PET film.

(Pressure-Sensitive Adhesive Layer-Forming Layered Sheet 1)

Added and mixed into 1 kg of acrylic acid ester copolymer A was 20 g of 4-methyl benzophenone as photo-polymerization initiator to prepare a pressure-sensitive adhesive composition (B-1).

This pressure-sensitive adhesive composition (B-1) was heat-melted, coated and formed into a sheet so that the thickness was 35 µm over a release-treated polyethylene terephthalate film (manufactured by Mitsubishi Plastics, Inc., "MRA75"; thickness: 75 µm) serving as a coating substrate and covered with a polyethylene terephthalate film (manufactured by Toyobo Co., Ltd., "E7006"; thickness: 38 µm) that had been subjected to release treatment to produce a pressure-sensitive adhesive layer-forming layered sheet 1 comprising PET film/UV-crosslinkable pressure-sensitive adhesive layer (B-1; thickness: 35 µm)/PET film.

(Pressure-Sensitive Adhesive Layer-Forming Layered Sheet 1')

A pressure-sensitive adhesive layer-forming layered sheet 1' comprising PET film/UV-crosslinkable pressure-sensitive adhesive layer (B-1'; thickness: 35 µm)/PET film was produced in a similar manner to the pressure-sensitive adhesive layer-forming layered sheet 1 described above, except that the coating substrate was changed to a release-treated polyethylene terephthalate film (manufactured by Mitsubishi Plastics, "MRF50"; thickness: 50 µm).

(Pressure-Sensitive Adhesive Layer-Forming Layered Sheet 2)

A pressure-sensitive adhesive layer-forming layered sheet 2 comprising PET film/UV-crosslinkable pressure-sensitive adhesive layer (B-1; thickness: 65 µm)/PET film was produced in a similar manner to the pressure-sensitive adhesive material layer-forming layered sheet 1, except that, in the pressure-sensitive adhesive material layer-forming layered sheet 1, the coating and the forming were such that the thickness of the pressure-sensitive adherent layer (B-1) was 65 µm.

(Pressure-Sensitive Adhesive Layer-Forming Layered Sheet 2')

A pressure-sensitive adhesive layer-forming layered sheet 2' comprising PET film/heat-crosslinkable pressure-sensitive adhesive layer (B-1'; thickness: 65 µm)/PET film was produced in a similar manner to the pressure-sensitive adhesive layer-forming layered sheet 2 described above, except that the coating substrate was changed to a release-treated polyethylene terephthalate film (manufactured by Mitsubishi Plastics, "MRF50"; thickness: 50 µm).

Example 1

Production of Adhesive Sheet 1

The PET film on both sides of the intermediate resin layer (A-1) in the intermediate resin layer-forming layered sheet 1 were sequentially peeled and removed, while a PET film on one side of the pressure-sensitive adhesive layers (B-1) and (B-1') in the pressure-sensitive adhesive layer-forming layered sheets 1 and 1' were peeled and the exposed adhesive surfaces were sequentially bonded to both surfaces of (A-1) with a laminator to produce a multilayer adhesive sheet comprising (B-1)/(A-1)/(B-1').

UV light was irradiated through the polyethylene terephthalate films remaining on the surfaces of (B-1) and (B-1') with a high-pressure mercury lamp so that the integrated amount of light at 365 nm was 1,000 mJ, UV-crosslinking (B-1), (A-1) and (B-1') to produce a pre-secondary curing transparent double-sided adhesive sheet 1 (total thickness: 180 µm).

Example 2

Production of Adhesive Sheet 2

The intermediate resin layer composition (A-2) and the pressure-sensitive adhesive composition (B-1) were co-extruded so as to be pressure-sensitive adhesive layer (B-1)/intermediate resin layer (A-2)/pressure-sensitive adhesive layer (B-1), coated and formed so as to have pressure-sensitive adhesive layer (B-1)/intermediate resin layer (A-2)/pressure-sensitive adhesive layer (B-1)=40/100/40 μm over a release-treated polyethylene terephthalate film (Mitsubishi resinous "MRA75"; thickness: 75 μm) and covered with a release-treated polyethylene terephthalate film (manufactured by Mitsubishi Plastics, "MRA50"; thickness: 50 μm) to form a multilayer sheet comprising PET film/(B-1)/(A-2)/(B-1)/PET film.

UV light was irradiated from one polyethylene terephthalate film side with a high-pressure mercury lamp so that the integrated amount of light was 1,000 mJ, UV-crosslinking (B-1), (A-2) and (B-1) to produce a pre-secondary curing transparent double-sided adhesive sheet 2 (total thickness: 180 μm).

Example 3

Production of Adhesive Sheet 3

Mixed and added into 1 kg of the acrylic acid ester copolymer A were 50 g of nonane diol diacrylate as crosslinking agent and 10 g of 4-methyl benzophenone as photo-polymerization initiator to prepare a pressure-sensitive adhesive composition (B-2).

This adhesive composition was heat-melted, coated with an applicator so as to become 170 μm in thickness to form a film over a release-treated polyethylene terephthalate film (manufactured by Mitsubishi Plastics, "MRF75"; thickness: 75 μm) and covered with a release-treated polyethylene terephthalate film (manufactured by Mitsubishi Plastics, "MRA50"; thickness: 50 μm) to form a sheet comprising PET film/pressure-sensitive adhesive layer (B-2)/PET film.

UV light was irradiated from one polyethylene terephthalate film side with a high-pressure mercury lamp so that the integrated amount of light was 1,000 mJ, UV-crosslinking (B-2) to produce a pre-secondary curing transparent double-sided adhesive sheet 3 (total thickness: 170 μm).

Example 4

Production of Adhesive Sheet 4

A pre-secondary curing transparent double-sided adhesive sheet 1 (total thickness: 260 μm) comprising the layer constitution (B-1)/(A-2)/(B-1') was produced in a similar manner to Example 1, except that the intermediate resin layer-forming layered sheet 2 (A-2) was used as the intermediate resin layer and the pressure-sensitive adhesive layer-forming layered sheets 2 and 2' were used as pressure-sensitive adhesive layers.

Comparative Example 1

Production of Adhesive Sheet 5

An acrylic acid ester copolymer (Mw=1,000,000; theoretical Tg: −61° C.) was prepared, comprising 48 parts by mass of 2-ethylhexyl acrylate, 50 parts by mass of 2-methoxyethyl acrylate (homopolymer Tg: −50° C.) and 2 parts by mass of 4-hydroxybutyl acrylate (homopolymer Tg: −80° C.), which were random-copolymerized.

Added with respect to 1 kg of this acrylic acid ester copolymer was 0.2 parts by mass in solid contents of adduct-type hexamethylene diisocyanate (manufactured by Asahi Kasei, DURANATE P301-75E) as crosslinking agent to prepare an adhesive material composition.

The adhesive composition was coated, formed and dried over a release-treated polyethylene terephthalate film (Mitsubishi Plastics, "MRA75"; thickness: 75 μm) then covered with a release-treated polyethylene terephthalate film (Mitsubishi Plastics, "MRF50"; thickness: 50 μm), and cured for one week under the conditions of 25° C. in temperature and 50% humidity for heat-crosslinking to produce a transparent double-sided adhesive sheet 5 (total thickness: 150 μm).

Comparative Example 2

Production of Adhesive Sheet 6

A post-secondary curing transparent double-sided adhesive sheet 6 (total thickness: 180 μm) was produced, comprising the pre-secondary curing transparent double-sided adhesive sheet 1 (total thickness: 180 μm) additionally irradiated with a high-pressure mercury lamp so that a further 1,000 mJ of UV light at 365 nm wavelength reached the adhesive layer, causing secondary-curing of (B-1), (A-1) and (B-1').

<Evaluation>

The adhesive sheets 1 to 6 described above were evaluated as follows:

(Indentation Hardness Measurement)

For the adhesive sheets 1 to 6 described above, release films were peeled, and the exposed adhesive surfaces were sequentially overlapped to layer several adhesive sheets so that the total thickness was within the range of 5 mm to 7 mm. This allows the influence of the hardness of the stage where the measurement sample is placed to be reduced, allowing the indentation hardness specific to the material to be compared and measured.

Then, the indentor of an Asker C2L durometer was pressed at a speed of 3 mm/minute vertically downward with a 1 kg load against the exposed adhesive surface of the layered adhesive sheet to measure the C2 Asker hardness (a).

In addition, for the adhesive sheets 1 to 4, ultraviolet irradiation was carried out from one of the release film sides while checking the integrated amount of light with an actinometer (UNIMETER UIT150 TYPE UIT-150A manufactured by Ushio Inc.) so that 2,000 mJ/cm$^2$ of UV light at 365 nm wavelength reached the adhesive sheet to produce adhesive sheets corresponding to post-secondary curing transparent double-sided adhesive sheets.

By a similar method to the above description, layering was carried out so that the total thickness was within the range of 5 mm to 7 mm and the indentor of the Asker C2L durometer was pressed at a speed of 3 mm/minute vertically downward with a 1 kg load against the exposed adhesive surface to measure the C2 Asker hardness (b).

(Processability)

With the release films still layered, the adhesive sheets 1 to 6 described above were cut using a Thompson die-cutter into 100 pieces with a 50 mm×80 mm Thompson blade, and the shapes of the edges of the cut sheets were visually observed.

Then, the assessment was "x (cross) (fail)" for those that had 10 pieces or more with glue flashes at the sheet edges and "o (circle) (pass)" for those with less than 10 pieces.

(Unevenness Followability)

A polarizer (manufactured by Nitto Denko Corp.; NWF-KDSEGHC-ST22) was pre-bonded to one of the sides above a glass plate (53×83 mm×t 0.5 mm) over the same dimensions to produce a plate serving as an adherend for test purposes, 0.03 mg of glass beads (approximately 200 particles) with a median particle size of 50 μm were scattered as pseudo-bubbling origins on the polarizer surface, which served as a substrate for anti-bubble reliability tests. A first release film of the adhesive sheets 1 to 6 cut in the processability evaluation was peeled and the exposed adhesive surface was adhered onto the substrate with a hand roller. Next, the remaining release film was peeled, a soda lime glass (53×83 mm×t 0.5 mm) was press-bonded to the exposed adhesive surface under reduced pressure (absolute pressure: 5 kPa), and then, autoclave treatment (50° C., 0.2 MPa, 20 minutes) was carried out for finishing bonding to produce a laminate (sample).

The produced laminates were visually observed, and the assessment was "o (circle) (pass)" for those in which the surface of glass beads scattered over the substrate were wetted by the adhesive sheet and the beads periphery was buried in the adhesive layer without a gap, and "x (cross) (fail)" for those in which there was lifting in the glass beads periphery.

(Anti-Bubble Reliability)

For the adhesive sheets 5 to 6, the laminates (samples) produced in the unevenness followability test described above served as samples for the anti-bubble reliability test.

Meanwhile, for the adhesive sheets 1 to 4, ultraviolet was irradiated against the laminates (samples) produced in the unevenness followability test described above through the soda lime glass with a high-pressure mercury lamp so that 2,000 mJ/cm$^2$ of UV light at 365 nm wavelength reached the adhesive sheets 1 to 4 to produce samples for the anti-bubble reliability test.

Each of these samples were left alone in a normal state (temperature: 23° C.; humidity: 50%) for one day, then, cured for 6 hours in a thermo-humidistat at 85° C. in temperature and 25% humidity, and the external appearance after curing was visually observed.

The assessment was "o (circle) (pass)" for those in which no new lifting occurred from the glass beads periphery and "x (cross) (fail)" for those in which bubbling or lifting occurred due to curing.

TABLE 1

|  | Example | | | | Comparative Example | |
| --- | --- | --- | --- | --- | --- | --- |
|  | 1 | 2 | 3 | 4 | 1 | 2 |
| Adhesive sheet | 1 | 2 | 3 | 4 | 6 | 7 |
| C2 Asker hardness (a) | 29 | 32 | 35 | 45 | 15 | 35 |
| C2 Asker hardness (b) | 37 | 37 | 40 | 48 | — | — |
| Processability | ○ | ○ | ○ | ○ | X | ○ |
| Unevenness followability | ○ | ○ | ○ | ○ | ○ | X |
| Anti-bubbling reliability | ○ | ○ | ○ | ○ | X | ○ |
| Overall evaluation | ○ | ○ | ○ | ○ | X | X |

Examples 1 to 4 are all pre-secondary curing transparent double-sided adhesive sheets in a state where UV-reactivity was left by forming an adhesive composition into the form of a monolayer or multilayer sheet and primary curing this by UV-crosslinking.

If two image display device-constituting members were layered through the pre-secondary curing transparent double-sided adhesive sheet described above, UV light was irradiated from the image display device-constituting member side, and the pre-secondary curing transparent double-sided adhesive sheet was UV-crosslinked to be secondary cured through this member, firmly crosslinking was found to be possible, allowing a transparent double-sided adhesive sheet after secondary curing to be obtained with a high indentation hardness.

In addition, in the relationship between the indentation hardness (C2 Asker hardness) (a) of the pre-secondary curing transparent double-sided adhesive sheet and the indentation hardness (C2 Asker hardness) (b) of the transparent double-sided adhesive sheet after secondary curing, it was found that, unevenness followability and anti-bubble reliability could be improved by controlling the relationship to be (b)−(a)≥2.

The invention claimed is:

1. A method for producing a laminate, the method comprising:
    forming an adhesive composition into a form of a monolayer or a multilayer sheet on a transparent release sheet;
    irradiating the adhesive composition with ultraviolet light through the transparent release sheet;
    primary-curing the monolayer or multilayer sheet by UV-crosslinking to obtain a pre-secondary curing transparent double-sided pressure-sensitive adhesive sheet;
    peeling the release sheet;
    layering two image display device-constituting members via the pre-secondary curing transparent double-sided adhesive sheet; and then
    irradiating ultraviolet light from a side of an image display device-constituting member, thereby UV-crosslinking and secondary-curing the pre-secondary curing transparent double-sided adhesive sheet through the member.

2. The method of claim 1, wherein the pre-secondary curing transparent double-sided adhesive sheet has a wavelength absorption for starting a UV-crosslinking reaction of from 315 nm to 400 nm.

3. The method of claim 1, wherein an indentation hardness (b) of the transparent double-sided adhesive sheet after the secondary curing is 33≤(b)≤80.

4. The method of claim 1, wherein an indentation hardness (a) of the pre-secondary curing transparent double-sided adhesive sheet after the primary-curing and an indentation hardness (b) of the transparent double-sided adhesive sheet after secondary curing satisfy a relation (b)−(a)≥2.

5. The method of claim 1, wherein the irradiating ultraviolet light from a side of an image display device-constituting member comprises irradiating ultraviolet light through a member with a light transmittance of 20% or greater in a wavelength range of 315 to 400 nm.

6. The method of claim 1, wherein, the image display device-constituting members are each laminates comprising a touch panel, an image display panel, a surface protection panel, a polarization film, or any combination thereof.

7. The method of claim 1, wherein the adhesive composition comprises a (meth)acrylic acid ester series polymer.

8. The method of claim 1, wherein the adhesive composition is a solvent-free system that does not contain a solvent and is hot-melt formable.

9. The method of claim 1, wherein a thickness of the monolayer or multilayer sheet is from 50 μm to 1 mm.

10. The method of claim 1, wherein the monolayer or multilayer sheet is a multilayer sheet comprising outermost layers and an intermediate layer, and a ratio of a thickness of each of the outermost layers to a thickness of the intermediate layer is from 1:1 to 1:20.

11. The method of claim 1, wherein an indentation hardness of the pre-secondary curing transparent double-sided adhesive sheet after the primary-curing is from 10 to 50.

12. The method of claim 1, wherein the forming an adhesive composition comprises forming the adhesive composition into a monolayer sheet.

13. The method of claim 1, wherein the forming an adhesive composition comprises forming the adhesive composition into a multilayer sheet.

* * * * *